United States Patent
Yoshikawa et al.

(10) Patent No.: US 6,915,769 B2
(45) Date of Patent: Jul. 12, 2005

(54) VARIABLE VALVE SYSTEM FOR INTERNAL COMBUSTION ENGINE

(75) Inventors: Satoshi Yoshikawa, Otsu (JP); Hideki Kanai, Kyoto (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/740,581

(22) Filed: Dec. 22, 2003

(65) Prior Publication Data

US 2004/0129239 A1 Jul. 8, 2004

(30) Foreign Application Priority Data

Dec. 26, 2002 (JP) ........................................ 2002-377450

(51) Int. Cl.[7] ................................................. F01L 1/34
(52) U.S. Cl. ............................... 123/90.17; 123/90.15; 123/90.16; 123/90.31
(58) Field of Search .......................... 123/90.15–90.18, 123/90.27, 90.31, 198 DC

(56) References Cited

U.S. PATENT DOCUMENTS

| | | | | |
|---|---|---|---|---|
| 5,009,203 A | * | 4/1991 | Seki ........................ | 123/90.16 |
| 5,529,031 A | * | 6/1996 | Yoshioka ................. | 123/90.15 |
| 5,628,286 A | * | 5/1997 | Kato et al. ............... | 123/90.15 |
| 5,927,239 A | * | 7/1999 | Kohrs et al. ............. | 123/90.17 |
| 6,311,654 B1 | * | 11/2001 | Ushida et al. ........... | 123/90.17 |
| 6,457,447 B1 | * | 10/2002 | Sato et al. ............... | 123/90.17 |
| 6,520,132 B2 | * | 2/2003 | Todo ........................ | 123/90.17 |
| 2001/0039933 A1 | * | 11/2001 | Sato et al. ............... | 123/90.17 |

FOREIGN PATENT DOCUMENTS

JP        7-233713 A        9/1995

* cited by examiner

Primary Examiner—Thomas Denion
Assistant Examiner—Kyle M. Riddle
(74) Attorney, Agent, or Firm—Birch, Stewart, Kolasch & Birch, LLP

(57) ABSTRACT

The opening timing of intake valves and/or the closing timing of exhaust valves driven to open and close by valve mechanisms is changed by a variable valve timing mechanism to change the valve overlap of the intake and exhaust valves. When vehicle stop detecting devices detect a stop of a vehicle, a control unit operates the variable valve timing mechanism to reduce the valve overlap.

6 Claims, 3 Drawing Sheets

VARIABLE VALVE SYSTEM FOR INTERNAL COMBUSTION ENGINE

CROSS REFERENCE TO RELATED APPLICATION

This non-provisional application incorporates by reference the subject matter of Application No. 2002-377450 filed in Japan on Dec. 26, 2002, on which a priority claim is based under 35 U.S.C. § 119(a).

BACKGROUND OF THE INVENTION (1) Field of the Invention

The present invention relates to a variable valve system for an internal combustion engine.

(2) Description of the Related Art

Conventionally, there has been known a variable valve system that includes a variable valve timing mechanism capable of changing valve overlap of intake and exhaust valves of an engine by varying the opening/closing timing of the intake and exhaust valves which are driven to open and close by valve mechanisms, and a control unit which controls the valve overlap of the intake and exhaust valves by operating the variable valve timing mechanism according to the operative state of the engine. The variable valve timing mechanism is comprised of a vane which is integrated with a cam shaft, and a housing which stores the vane in an oil chamber therein and is formed integrally with a sprocket for transmitting rotation of a crank shaft to the cam shaft. The variable valve timing mechanism changes the amount of oil, which is supplied into the oil chamber, according to the operative state of the engine to shift the phase of a cam to the advanced angle side/the retarded angle side to vary the valve opening/closing timing.

If the phase of an exhaust cam is on the retarded angle side, so-called internal EGR (Exhaust Gar Recirculation) amount is increased due to a large valve overlap of the intake and exhaust valves. On the other hand, if the phase of the exhaust cam is on the advanced angle side, the internal EGR amount is decreased due to a small valve overlap of the intake and exhaust valves. When the engine is revolving at an extremely low speed, e.g., when the engine is started, an increase in internal EGR amount decreases the quantity of fresh air, while a decrease in the internal EGR amount increases the quantity of fresh air. In contrast with the exhaust cam, if the phase of an intake cam is on the retarded angle side, the valve overlap of the intake and exhaust valves is small, and if the phase of the exhaust cam is on the advanced angle side, the valve overlap of the intake and exhaust valves is large. Valve springs apply force against each of the intake and exhaust cams. The pressure of oil, which is supplied into the oil chamber in the variable valve timing mechanism, is low immediately after starting or during idling. For this reason, immediately after staring or during idling, rotation of a crank shaft is transmitted to the sprocket, and the sprocket tries to rotate, but each cam is forced in such a direction as to inhibit rotation thereof, and hence the phase of each cam is relatively brought into the retarded angle side.

Therefore, when the engine is started, if the phase of the exhaust cam is brought into the retarded angle side, it affects the startability. Therefore, it has been proposed that the variable valve timing mechanism is provided with a lock pin which locks the phase of the cam in the most advanced angle side. The lock pin is actuated by hydraulic control when the phase of the cam is brought into the most advanced angle side, and is configured to hold the exhaust cam in the most advanced angle position. Thus, if the exhaust cam is brought into and held in the most advanced angle position when the engine is idling immediately before being stopped, the engine can be stopped with the exhaust cam being held in the most advanced angle position.

According to the above described arrangement in which the lock pin actuated by hydraulic control holds the exhaust cam on the most advanced angle side, there may be a case where the exhaust cam cannot be held in the most advanced angle side by the lock pin. The driver usually stops the engine by turning off an ignition key when the engine is idling. In the case where a vehicle is equipped with an automatic transmission, the engine is stopped when a shift lever is positioned in either one of a P-range (parking range) and an N-range (neutral range), which mean that the vehicle is at a standstill. If the engine is idling while the shift lever is positioned in either one of the P-range and the N-range, the phase of the exhaust cam is brought into the retarded angle side, and therefore, if the ignition key is turned off in this state, the exhaust cam cannot be locked on the most advanced angle side. This deteriorates the startability when the engine is restarted, and causes unstable idling after the engine is started.

SUMMARY OF THE INVENTION

The present invention relates to a variable valve system for an internal combustion engine, which realizes a high startability in restarting the engine, and enables the engine to idle in a stable manner.

To attain the above object, there is provided a variable valve system for an internal combustion engine which comprises valve mechanisms that drive intake valves and exhaust valves of the internal combustion engine to open and close, a variable valve timing mechanism that changes at least one of valve opening timing of the intake valves and valve closing timing of the exhaust valves to change the valve overlap of the intake valves and the exhaust valves, a stop detecting device that detects a stop of a vehicle, and a control unit operable when the stop detecting device detects a stop of the vehicle, for operating the variable valve timing mechanism such that the valve overlap is reduced. Therefore, it is possible to reduce the valve overlap when the engine is restarted.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

The present invention will now be described in detail with reference to the accompanying drawings showing preferred embodiments thereof. It is to be understood, however, that the dimensions, materials, shapes, and arrangements of component parts should not be restricted to the following embodiments, but changes within the purview of the appended claims may be made without departing from the true scope.

Figure 1:
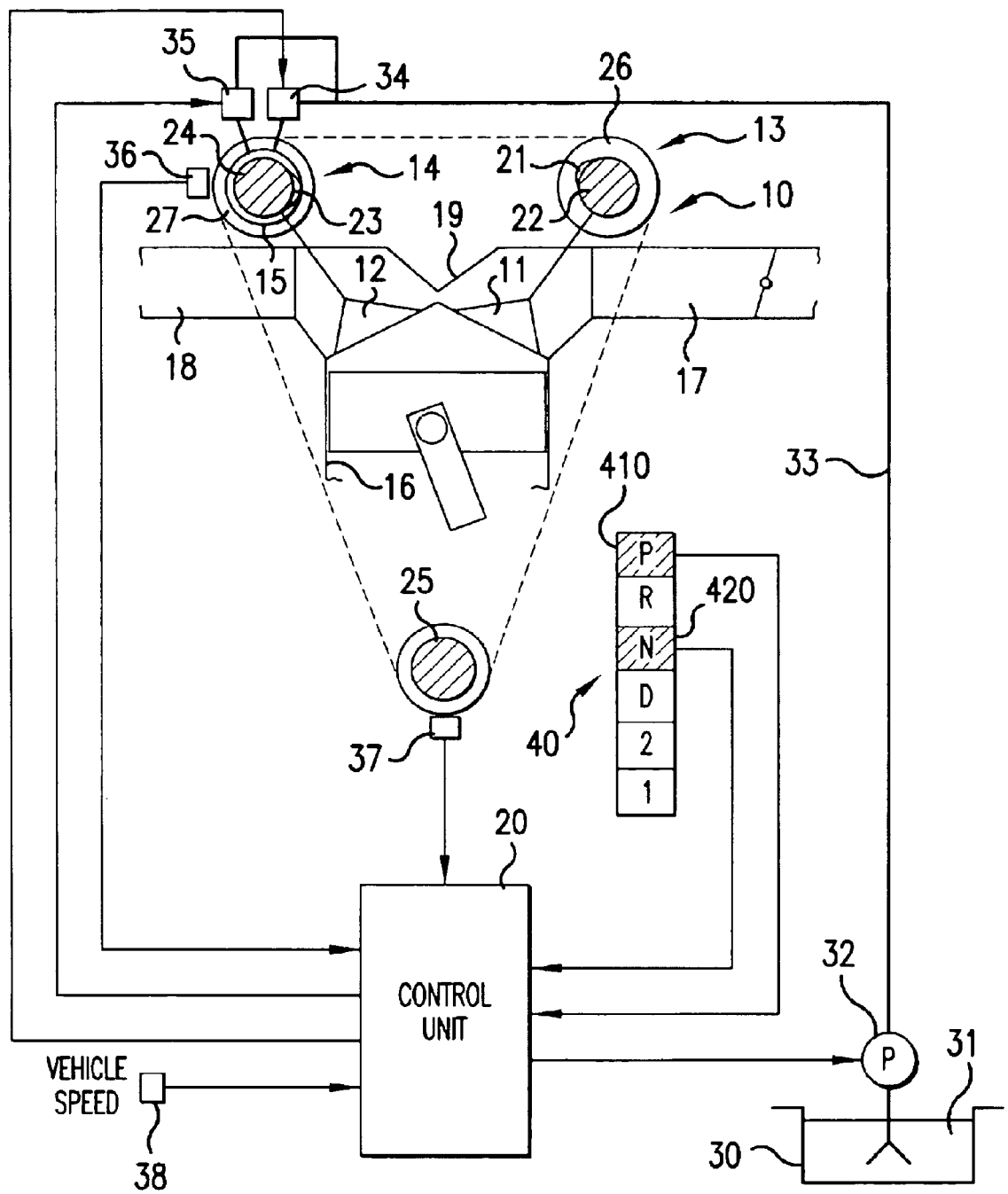
FIG. 1 is a view showing the construction of a variable valve system for an internal combustion engine according to an embodiment of the present invention.

As shown in FIG. 1, a variable valve system for an engine 10 as an internal combustion engine is comprised of valve mechanisms 13 and 14 which drive a plurality of intake valves 11 and exhaust valves 12 to open and close, a variable valve timing mechanism 15 which changes valve closing timing of the exhaust valves 12 to change the valve overlap of the intake valves 11 and the exhaust valves 12, a control unit 20 which controls the valve overlap by operating the valve timing mechanism 15 according to an operative state of the engine 10, and an inhibitor switch 40 serving as a vehicle stop detecting device which detects a stop of a vehicle. The control unit 20 has a function of operating the variable valve timing mechanism 15 such that the valve overlap is reduced when the inhibitor switch 40 detects a stop of the vehicle.

The intake valve 11 and the exhaust valve 12 are disposed on a cylinder head 19 provided at an upper part of each cylinder 16 in the engine 10. The valve mechanism 13 is comprised of an intake cam shaft 22 formed with an intake cam 21 on which an upper end of the intake valve 11 is abutted via a rocker arm, not shown, and a valve spring which forces the intake valve 11 in a valve closing direction. The valve mechanism 14 is comprised of an intake cam shaft 24 formed with an exhaust cam 23 on which an upper end of the exhaust valve 12 is abutted via a rocker arm, not shown, and a valve spring which forces the exhaust valve 12 in a valve closing direction. A sprocket 26, to which rotation of a crank shaft 25 is transmitted, is mounted on an end of the intake cam shaft 22, and a sprocket 27, to which rotation of the crank shaft 25 is transmitted, is mounted on an end of an exhaust cam shaft 24 via the variable valve timing mechanism 15.

Figure 2:
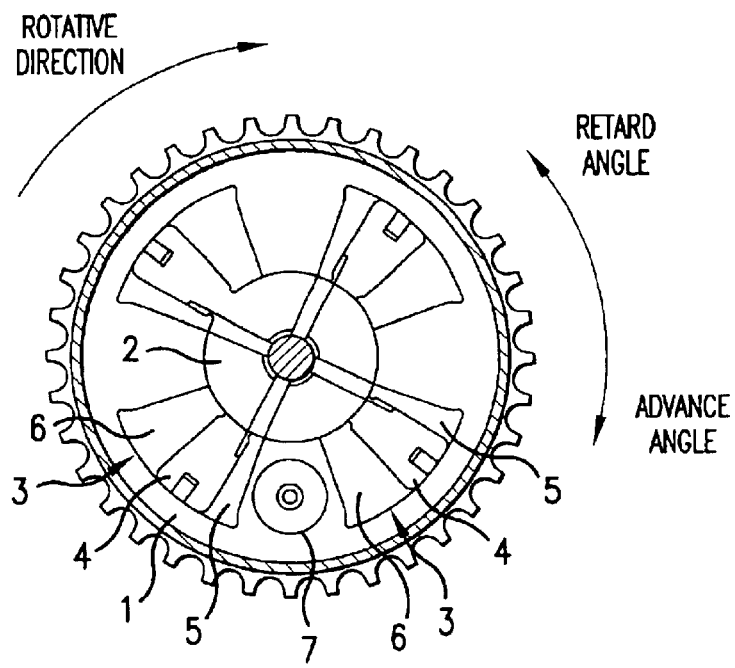
FIG. 2 is a sectional view showing an example of the construction of a variable valve timing mechanism.

The variable valve timing mechanism 15 is constructed in a known manner as shown in FIG. 2. The construction of the variable valve timing mechanism 15 will now be outlined. In the variable valve timing mechanism 15, a housing 1 which rotates in synchronism with the crank shaft 25 and a rotor 2 which is connected to the exhaust cam shaft 25 are arranged coaxially with each other. A fluid chamber 3 formed in the housing 1 is partitioned into an advanced angle chamber 5 and a retarded angle chamber 6, into which driving oil is to be supplied, by a vane 4 of the rotor 2. An oil pump 32 is run to supply oil 31 from an oil tank 30 to the advanced angle chamber 5 and the retarded angle chamber 6 by an oil pump 32 via an oil channel 33 and a control valve 34. Rotating the housing 1 and the rotor 2 (vane 4) relatively to each other shifts the rotation phase (cam shaft phase) of the exhaust cam shaft 27 relative to the crank shaft 25 to the advanced angle side or the retarded angle side, i.e., advances or retards the valve closing timing.

The variable valve timing mechanism 15 is provided with a lock pin 7 serving as a fixing device which locks the relative rotation of the housing 1 and the rotor 2 (vane 4) in the most advanced angle phase where the valve timing of the exhaust valves 12 is advanced to the maximum as shown in FIG. 2. Adjusting the amount of oil by controlling the control valve 35, which is provided in the oil channel 33 to control oil pressure applied to the lock pin 7, shifts the lock pin 7 to a locking position or an opening position.

The control unit 20 has essential parts thereof implemented by a known computer. The inhibitor switch 40, a cam phase sensor 36 which detects the phase of the exhaust cam shaft 25, and a crank angle sensor 37 which detects the rotation of the crank shaft 25 are connected to an input of the control unit 20. In the present embodiment, the inhibitor switch 40 is comprised of switch sections 410 and 420 which are connected to the control unit 20, for detecting a shift lever, not shown, being positioned in a P-range and an N-range, so that the inhibitor switch 40 outputs information indicative of a stop of the vehicle to the control unit 20. The crank angle sensor 37 outputs information indicative of whether the engine 10 has been started or not and information indicative of the revolutionary speed of the engine 10 to the control unit 2 to the control unit 20.

Figure 3:
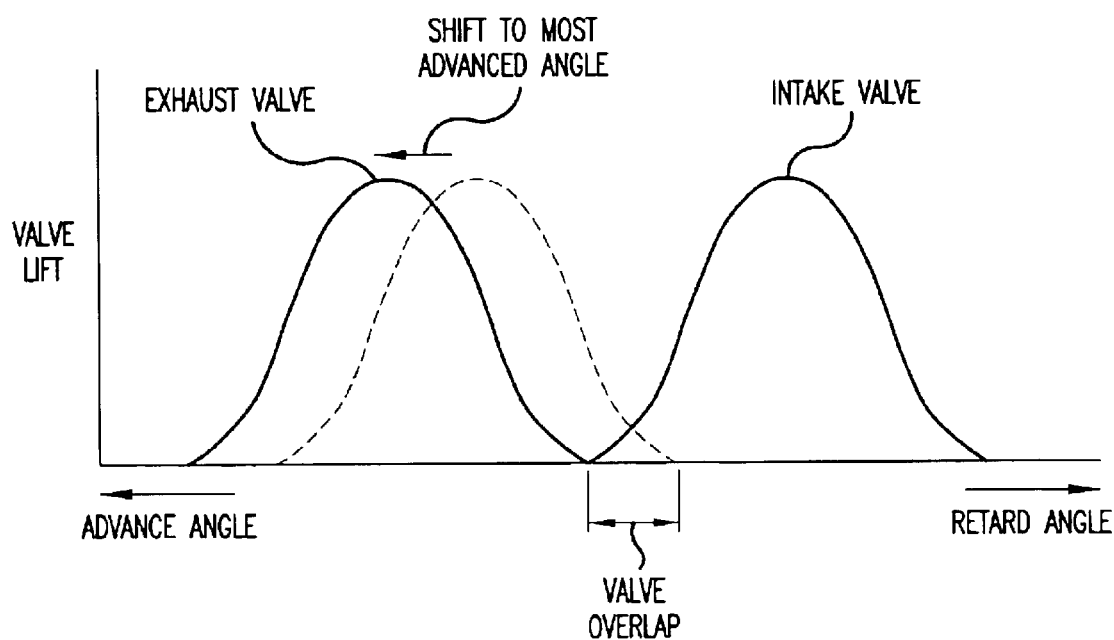
FIG. 3 is a chart showing opening/closing timing of intake and exhaust valves and a shift in the phase of an exhaust cam.
Figure 4:
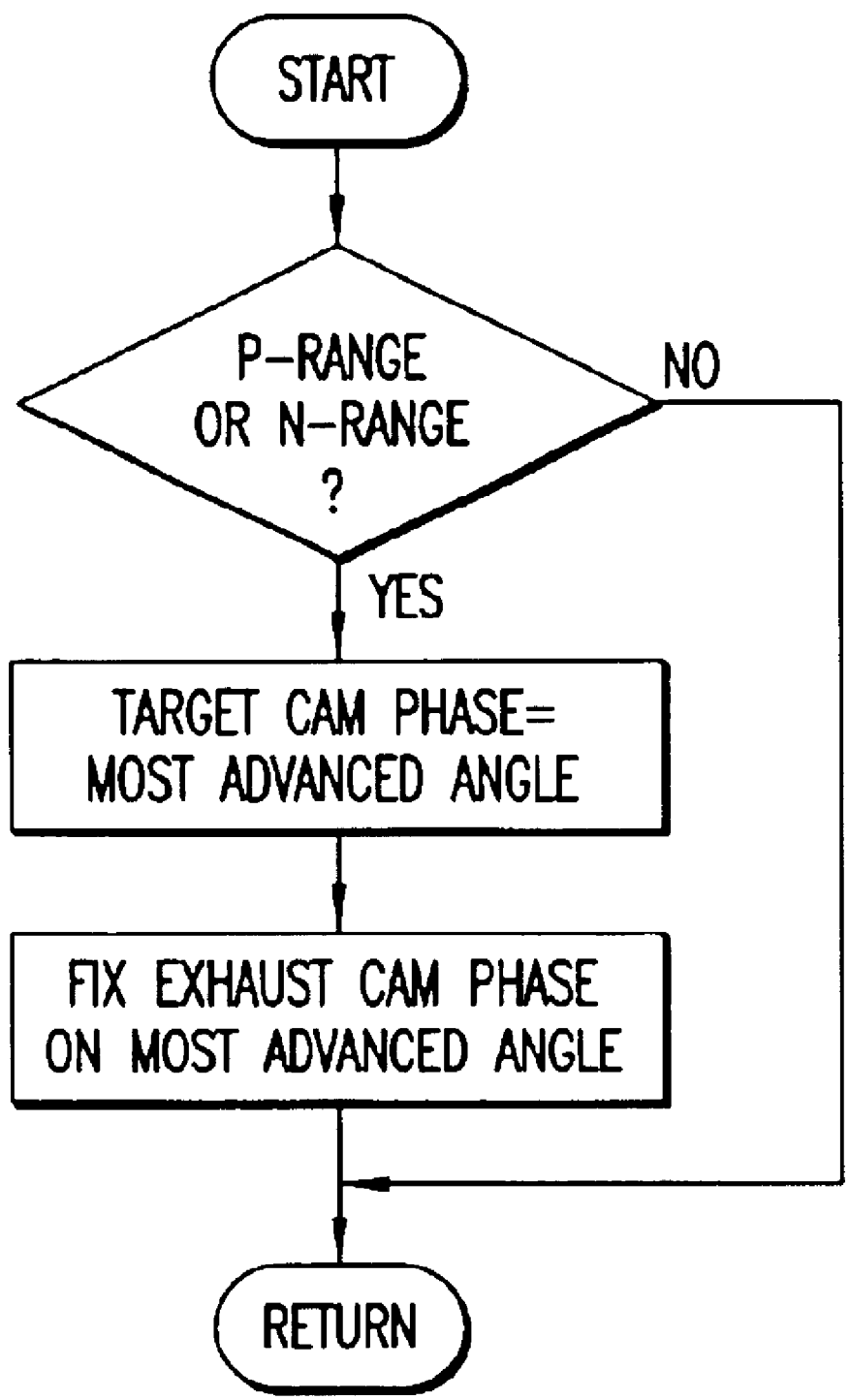
FIG. 4 is a flow chart showing an example of a process in which a control unit controls the variable valve timing mechanism.

Referring next to FIG. 4, a description will be given of an example of a control process carried out by the variable valve system constructed as described above. In this example, it is assumed that the engine 10 has been already started and the oil pump 32 is running. In Step S1, the control unit 20 provides control to cause the valve timing mechanism 15 to make a determination as to whether the shift lever, not shown, is positioned in the P-range or the N-range. This determination is made according to whether the switch section 410 or the switch section 420 is on or off. If the switch section 410 or the switch section 420 is on, the process proceeds to Step S2 wherein the control valve 34 is controlled to shift the phase of the exhaust cams 12 from a position indicated by a broken line in FIG. 3 to the most advanced angle position indicated by a solid line in FIG. 3. When it is detected that the phase of the exhaust cam 23 lies in the most advanced angle position according to the information output from the cam phase sensor 36, the process proceeds to Step 53 wherein the control valve 35 is controlled to shift the lock pin 7 to the locking position, so that the exhaust cam 23 is forced to be fixed in the most advanced angle phase, followed by termination of the control process.

To stop the engine 10, the driver turns off an ignition key in the P-range or the N-range, and hence, when the engine 10 is restarted, the valve overlap can be surely kept small since the exhaust cam 23 is held in the most advanced angle phase. Therefore, the EGR amount in the cylinder 12 is reduced to ensure a sufficient quantity of intake air and thus improve the startability of the engine. Further, immediately after the engine 10 is started, the variable valve timing mechanism 15 cannot be properly controlled due to a delay in response of the pressure of the oil 31 discharged from the oil pump 32, but since the exhaust cam 23 is held in the most advanced angle phase when the vehicle stops, the valve overlap can be surely kept small when the engine 10 is started. Therefore, fuel can be satisfactorily combusted, and the engine 10 can idle in a stable manner.

Although in the present embodiment, an automatic transmission is used and hence the shift position of the shift lever is used as a parameter for determining whether the vehicle is at a standstill or not, the determination as to whether the vehicle is at a standstill or not should not necessarily be made based on such a parameter. For example, in the case where a manual transmission is used, information indicative of the vehicle speed output from a vehicle speed sensor 38 is input the control unit 20, and a predetermined speed (0 to 3 km/h) is set in the control unit 20. Then, the information indicative of the vehicle speed is compared with the predetermined vehicle speed. If the vehicle speed is equal to or lower than the predetermined speed, it is then determined that the vehicle is at a standstill, and the exhaust cam 23 is brought into the most advanced angle phase and is held in the most advanced angle position by the lock pin 7.

Further, although in the present embodiment, the variable valve timing mechanism 15 is provided at a location close to the exhaust valve 12 so that the valve closing timing of the exhaust valve 12 can be varied to change the valve overlap, this is not limitative, but the variable valve timing mechanism 15 may be provided at a location close to the intake valve 11 so that the valve opening timing of the intake valve 11 can be varied to change the valve overlap. In this case, when it is determined that the vehicle is at a standstill, the valve opening timing of the intake valve 11 is retarded.

According to the present invention, when the stop detecting device 40, 38 detects a stop of the vehicle, the control unit 20 operates the variable valve timing mechanism 15 such that the valve overlap is reduced. Therefore, when the vehicle is at a standstill, the valve overlap is forced to be reduced, which improves the startability when the engine 10 is restarted from standstill.

Further, according to the present invention, in the case where the variable valve timing mechanism 15 varies the valve closing timing of the exhaust valve 12, when it is detected that the vehicle is at a standstill, the control unit 20 provides control to advance the valve closing timing of the exhaust valve 12 to reduce the valve overlap. Therefore, when the engine 10 is started, the exhaust cam 23 is positioned in the advanced angle side, which realizes a high startability when the engine 10 is restarted. Further, according to the present invention, since the fixing device 7 fixes the valve closing timing of the exhaust valve 12, which has been advanced by the control unit 20, it is possible to surely achieve a high stability when the engine 10 is restarted.

What is claimed is:

1. A variable valve system for an internal combustion engine, comprising:

a valve mechanism that drives an intake valve and an exhaust valve of the internal combustion engine;

a variable valve timing mechanism that changes at least one of a valve opening timing of the intake valves and a valve closing timing of the exhaust valves to change a valve overlap of the intake valve and the exhaust valve;

a vehicle stop detecting device that detects a stopped state of a vehicle; and a control unit that reduces the valve overlap when said vehicle stop detecting device detects that the vehicle is in the stopped state.

2. A variable valve system for an internal combustion engine according to claim 1, wherein said variable valve timing mechanism changes the valve closing timing of the exhaust valve, and said control unit advances the valve closing timing of the exhaust valve to reduce the overlap when said vehicle stop detecting device detects that the vehicle in the stopped state.

3. A variable valve system for an internal combustion engine according to claim 2, wherein said variable valve timing mechanism includes a fixing device that fixes the valve closing timing of the exhaust valves in an advanced state.

4. A variable valve system for an internal combustion engine according to claim 1, wherein said vehicle stop detecting device detects whether a shift lever of an automatic transmission is in either one of a parking range or a neutral range to determine whether the vehicle is in the stopped state.

5. A variable valve system for an internal combustion engine according to claim 1, wherein said vehicle stop detecting device detects a speed of the vehicle, and determines that the vehicle is in the stopped state when the detected speed is equal to or lower than a predetermined value.

6. A variable valve system for an internal combustion engine according to claim 1, wherein said variable valve timing mechanism changes the valve opening timing of the intake valve, and said control unit retards the valve opening timing of the intake valve to reduce the overlap when said vehicle stop detecting device detects that the vehicle in the stopped state.

* * * * *